Nov. 1, 1949.  H. C. OTTESON  2,486,673

POLARITY INDICATING APPARATUS

Filed March 18, 1946

INVENTOR
HERBERT C. OTTESON
BY
John E. Stryker
ATTORNEY

Patented Nov. 1, 1949

2,486,673

UNITED STATES PATENT OFFICE 2,486,673

POLARITY INDICATING APPARATUS

Herbert Chester Otteson, St. Paul, Minn.

Application March 18, 1946, Serial No. 655,063

7 Claims. (Cl. 175—183)

It is an object of this invention to provide novel, simple and reliable apparatus for determining or testing the polarity of electromagnets.

A further object is to provide a polarity indicator which is adapted to utilize alternating current from a convenient source and to supply the electromagnet to be tested with alternating current from the same source so that the current flowing in the polarity indicator is synchronized with that flowing in the electromagnet under test.

A further object is to provide apparatus of the class described which is adapted to facilitate the determination of the direction of armature rotation in single phase alternating current motors.

Other objects will appear and be more fully pointed out in the following specification and claims.

During the assembly and repair of the electromagnets of motors, generators and other electrical apparatus and machines it is essential to identify and properly locate the north and south poles of the magnets and it is common practice to use a simple magnetized needle such as that of a mariner's compass for determining polarity while current is passed through the electromagnet to be treated. The compass needle is merely moved into the magnetic field created by the energized coil so that the end of the indicating needle of opposite polarity to that of the pole under test is attracted and indicates the polarity. Where such simple magnetic needles are used for this purpose the tests are not always reliable because in many cases the magnetic fields created by the coils are strong enough to cause reversal of the poles of the indicator needle. Moreover, simple magnetized needles cannot be used to indicate the polarity of electromagnets which are supplied with alternating current. By the present invention I obviate the disadvantageous features of the common indicating devices and facilitate the making of reliable determinations of the polarity of electromagnets supplied with alternating current and I also facilitate the determination of the direction of armature rotation in alternating current motors.

The invention will be best understood by reference to the accompanying drawing which illustrates, by way of example and not for the purpose of limitation, a preferred form of my apparatus.

Figure 3:
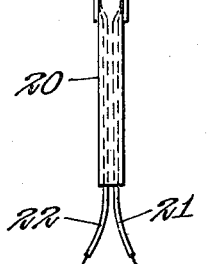
Fig. 3 is a plan view showing my indicator compass head in detail.
Figure 3:
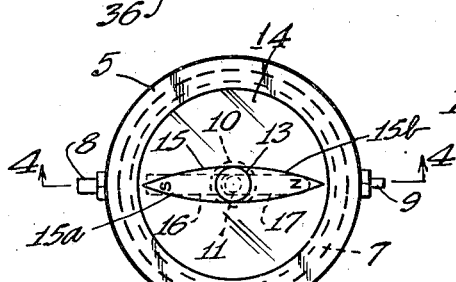
Figure 4:
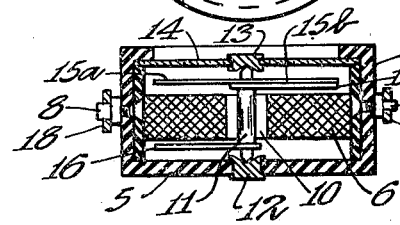
Fig. 4 is a section taken on the line 4—4 of Fig. 3.

As best shown in Figs. 3 and 4, my improved indicating compass has a substantially cylindrical casing 5, open at the upper end or face and constructed from non-magnetic or insulating material. Mounted within this casing is a coil 6 disposed with the axis of its convolutions concentric with the casing and separated from the casing by a cylindrical insulator 7. The terminals of the coil 6 are connected respectively to studs 8 and 9 which project from opposite peripheries of the casing 3 for connection with circuit conductors. Revoluble within a central opening 10 in the coil 6 is a pivot 11 which may be constructed from soft iron or other magnetizable material. This pivot extends coaxially within the coil and is supported at its ends in jewel type bearings 12 and 13. The normally upper bearing 13 is mounted centrally in a transparent closure member 14 which allows a view of an indicator needle 15 fixed on the pivot 11. Vanes 16 and 17 of magnetizable material are also fixed on the pivot 11 and arranged to project in opposite directions therefrom at the lower and upper ends respectively of the coil 6. The indicator needle 15 is constructed from non-magnetizable material and one of its end portions 15a carries a legend, e. g., the letter S indicating the south pole, while the opposite end portion 15b carries a legend indicative of the opposite polarity or north pole. The vane 16 is shown in spaced parallel relation to the needle end portion 15a and the vane 17 directly below and in contact with the end portion 15b.

When the coil 6 is energized by passing current through it in the predetermined direction, the pivot 11 and vanes 16 and 17 become magnetized, the vane 16 becomes the north pole and the vane 17 the south pole. With the coil thus energized, the periphery of the casing 5 is merely brought into the magnetic field near a pole of the electromagnet to be tested whereupon the indicator needle 15 correctly shows the polarity. For example, if the adjacent electromagnet pole happens to be a north pole, the south polarized vane 17 will be attracted and will cause the end portion 15b of the needle to point toward the pole under test. In a similar manner, the end portion 15a will point to a south pole under test when the compass casing is moved to indicating position. Thus the indicator needle 15 rotates automatically to indicate correctly by its indicia whether the particular pole under test is north or south.

Figure 2:
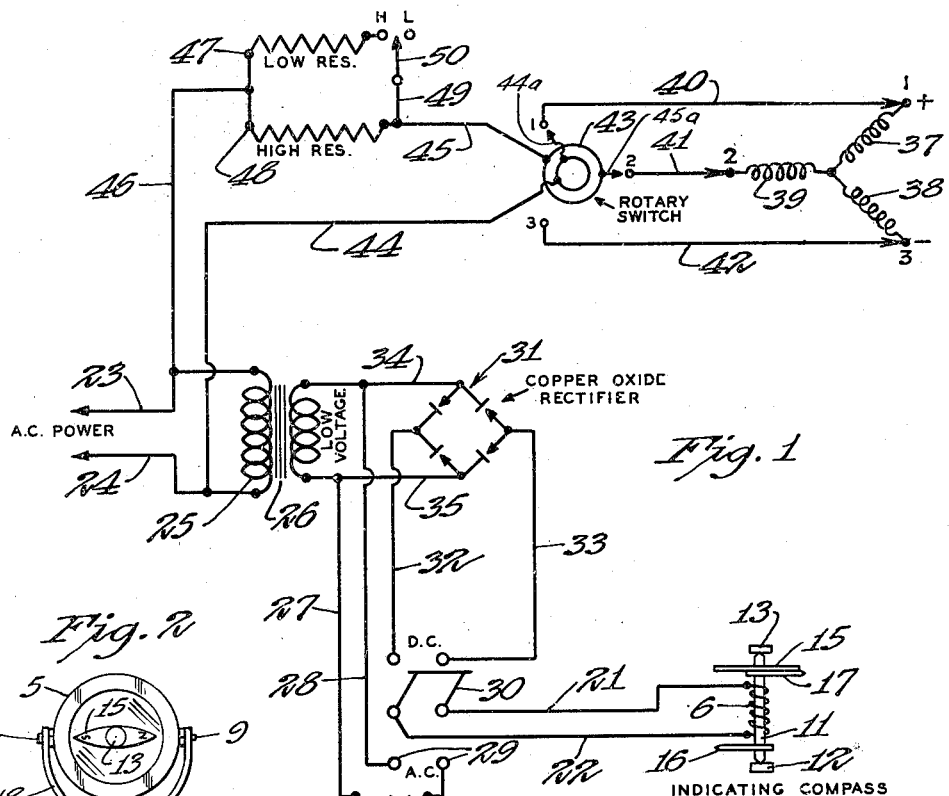
Fig. 2 is a plan view of my improved indicating compass head and its supporting handle, together with a fragmentary portion of the circuit conductors or flexible leads.
Figure 2:
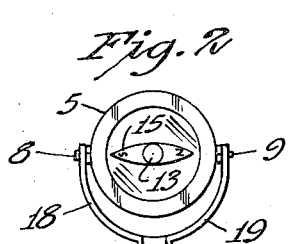

As shown in Fig. 2, my improved indicating compass is preferably mounted between fork members 18 and 19 which are conductors pivotally joined to the studs 8 and 9 respectively and attached to a handle 20. Circuit wires 21 and 22 extend respectively to the fork members 19 and 18 through an axial passage formed in the handle 20. The wires 21 and 22 constitute flexible leads of sufficient length to permit the indicating compass to be moved to the electromagnet poles to be tested. The casing 5 is preferably free to rotate between the fork members 18 and 19 to facilitate the taking of readings in the various restricted openings in the machines where the poles of the electromagnets to be tested for polarity are located.

Figure 1:
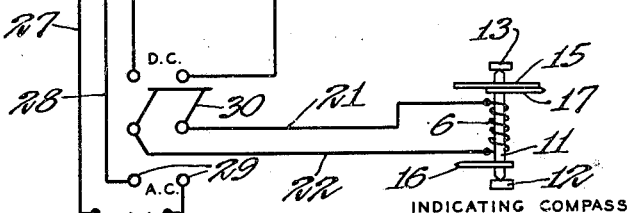
Figure 1 is a diagrammatic illustration of preferred apparatus including suitable circuits and showing connections for the several armature or field windings of a three phase alternating current motor.

Referring to Fig. 1, circuit wires 23 and 24 are adapted to be connected to any convenient source of or outlet for alternating current. These wires extend to opposite terminals of a primary coil 25 of a transformer indicated generally by the numeral 26. From opposite terminals of the secondary coil of this transformer, conductors 27 and 28 extend to terminals 29 of a double throw, double pole switch indicated generally by the numeral 30. This switch is adapted to be operated to connect the wires 21 and 22 leading to the indicating compass either to the source of alternating current or to supply these wires with direct current from a rectifier indicated generally at 31, the direct current supply wires being indicated by the numerals 32 and 33. The rectifier 31 is supplied with current from the transformer 26 through wires 34 and 35. To compensate for the voltage drop in the rectifier circuit a suitable resistance 36 is included in the alternating current circuit which includes the wires 27 and 28.

As further shown in Fig. 1, windings of a three phase alternating current motor are indicated respectively by the numerals 37, 38 and 39 and terminals of these coils by the numerals 1, 2 and 3 respectively. For making circuit connections with such terminals, my indicating apparatus is provided with conductor leads 40, 41 and 42 arranged in circuits under control of a rotary, double pole, triple throw switch 43 so that the rotor windings may be selectively energized from the common source of alternating current. The switch 43 has rotary contacts 44a and 45a projecting from its respective poles in fixed, spaced relation one to the other to close the circuit either through the windings 39 and 37 or through the windings 37 and 38, or 38 and 39. Current is supplied to one pole of the switch 43 and contact 44a by a wire 44 branching from the wire 24 and to the other pole and contact 45a by wires 45 and 46 extending from the wire 23 and including, in series, a suitable variable resistance. This variable resistance comprises a low resistance 47 and a parallel, relatively high resistance 48 and there is a branch wire 49 extending from the wire 45 to a switch 50 adapted to be operated to cut out the low resistance 47. When the switch 50 is in its open position, the high resistance 48 only is included in circuit and when the switch 50 is closed the lower resistance 47 is included so that current may be supplied at a higher rate to the coil under test.

Operation

When an electromagnet of the alternating current type is to be tested for polarity, the positive lead 40 and negative 42 may be connected to the terminals of the coil to be tested and the switch 43 is operated in appropriate manner to excite the coil from the alternating current supply. Alternating current from the same source is now supplied to the coil 6 through the lead wires 21 and 22 by closing the switch 30 at the terminals 29. The resulting changes in polarity of the coil 6 are in synchronization with those of the coil under test and it is only necessary to move the casing 5 to a position in proximity to the pole to be tested to cause the indicator needle 15 to become operative. Since the vanes 16 and 17 are magnetized and given rapidly changing polarity by the flow of alternating current in the coil 6, the vane whose polarity at any given moment corresponds to that of the pole under test will be repelled and the vane of opposite polarity will be attracted. However, since the changes in the respective coils occur simultaneously, the indicator needle 15 remains in a substantially fixed position relative to the pole under test as long as the magnetized vanes 16 and 17 are within the magnetic field of such pole. Consequently, my apparatus gives reliable indications of the polarity of the magnets under test.

In cases where the electromagnet to be tested normally receives direct current its coil is supplied with direct current during the test either through suitable connections with the rectifier 31 or from any other suitable source and my indicating compass is used as hereinbefore described after operating the switch 30 to connect the direct current wires 32 and 33 to the wires 22 and 21 respectively.

To determine the proper connections for the windings of an alternating current, three phase motor, the leads 40, 41 and 42 may be connected to the terminals of the armature or field windings 37, 38 and 39 to be tested, as indicated in Fig. 1, and the switch 30 is closed to connect the leads 21 and 22 to the alternating current supply. Then by using my indicating compass successively in proximity to the several poles, the polarity of each is determined and noted. Such tests are facilitated, for example, by operating the rotary switch 43 so that the circuit wires 44 and 45 are successively connected to the terminals of windings 37, 38 and 39. Polarity readings are thereby taken which indicate whether correct connections have been made. Rearrangement of the connections between windings may be necessary to cause the motor to operate properly. The resistances 47 and 48 under control of the switch 50 afford means for adjusting the current supplied to the electromagnets to be tested.

To determine the direction of rotation of the armature of a single phase, alternating current motor from which the armature has been removed or which is being assembled, my compass indicator is placed near one of the poles, the starting switch of the motor is closed and the needle 15 will then point to a position between the adjacent starter and running coil poles. As the next step, the motor starting switch is opened and with the running coils energized the needle will shift so that it points to the pole of a running coil. The direction of rotation is indicated by the direction of shift of the compass needle 15 when the motor starter switch is opened.

My improved apparatus, including the compass indicator, transformer, rectifier, resistance and circuit conductors may be enclosed in a compact casing of pocket size so that it is ready for instant use by electricians or other workmen engaged in the assembly and/or repair of electrical machines. It is durable and gives accurate, reliable and highly sensitive polarity indications, requiring a minimum of skill and knowledge on the part of the operator.

Having described my invention, what I claim as new and desire to protect by Letters Patent is:

1. Polarity indicating apparatus comprising, a coil, a centrally disposed pivot associated with said coil, magnetizable vanes carried by said pivot and projecting in opposite directions adjacent to opposite ends of said coil respectively, pointer means carried by and projecting at opposite sides of said pivot, said pointer means having polarity indicia at opposite sides of the pivot, and a circuit adapted to connect the terminals of said coil to a source of current, said pivot, vanes and pointer means being freely rotatable relative to said coil.

2. Polarity indicating apparatus comprising, a coil, a magnetizable pivot supported coaxially within said coil, magnetizable vanes carried by said pivot and projecting in opposite directions therefrom adjacent to opposite ends respectively of said coil, pointer means carried by and projecting at opposite sides of said pivot and having polarity indicia at opposite sides thereof and circuit wires adapted to connect the terminals of said coil to a source of current.

3. Polarity indicating apparatus comprising, a coil, having an axial opening, a magnetizable member revolubly supported in said opening, magnetizable vanes carried by said member and projecting in opposite directions adjacent to opposite ends respectively of said coil, pointer means carried by and projecting from opposite sides of said member and having polarity indicia thereon, and means for connecting said coil to a source of current.

4. Polarity indicating apparatus comprising, a coil, a magnetizable member revolubly supported coaxially within said coil, magnetizable vanes carried by said member and projecting in opposite directions therefrom at opposite ends of said coil respectively, pointer means carried by and projecting from opposite sides of said member and having polarity indicia at opposite sides thereof, an electric circuit including said coil, means for connecting said circuit to a source of alternating current and a second circuit adapted to be connected to said source of alternating current and including leads adapted to be connected to the respective terminals of an electromagnet the polarity of which is to be determined whereby the windings of an electromagnet may be included in said second circuit, said first mentioned coil and its associated vanes and pointer means being movable to a position adjacent to a pole of an electromagnet so connected in said second circuit and being operative to indicate its polarity when alternating current from said source is flowing in said circuits.

5. Polarity indicating apparatus comprising, a circuit adapted to be supplied with alternating current, a coil included in said circuit, a magnetizable member revolubly supported coaxially within said coil, magnetizable vanes carried by said member and projecting in opposite directions adjacent to opposite ends respectively of said coil, pointer means carried by said member and having polarity indicia at opposite sides of said member and a second circuit adapted to be supplied with alternating current and including leads adapted to be connected to the respective terminals of an electromagnet the polarity of which is to be determined whereby the windings of an electromagnet may be included in said second circuit, said first mentioned coil and its associated vanes and pointer means being movable adjacent to a pole of an electromagnet so connected in said second circuit to indicate its polarity.

6. Polarity indicating apparatus comprising, a circuit adapted to be supplied with alternating current, a coil included in said circuit, a magnetizable member revolubly supported coaxially within said coil, magnetizable vanes carried by said member and projecting in opposite directions adjacent to opposite ends respectively of said coil, pointer means carried by said member and having polarity indicia at opposite sides of the member, a second circuit adapted to be supplied with alternating current, a double pole, multiple throw switch included in said second circuit and conductors adapted to severally connect said switch to the terminals of the electromagnets of a multiple phase machine, said switch being operative to selectively include any of said electromagnets in said second circuit and said first mentioned coil and its associated vanes and pointer means being movable adjacent to a pole of either of said electromagnets to indicate its polarity.

7. Polarity indicating apparatus comprising, a circuit adapted to be supplied with alternating current, a coil included in said circuit, a magnetizable member revolubly supported coaxially within said coil, magnetizable vanes carried by said member and projecting in opposite directions adjacent to opposite ends respectively of said coil, pointer means carried by said member and having polarity indicia at opposite sides of the member, a second circuit adapted to be supplied with alternating current, connectors included in said second circuit and adapted to be connected to the terminals of an electromagnet the polarity of which is to be determined and a variable resistance included in said second circuit, said first mentioned coil and its associated vanes and pointer means being movable to a position adjacent to a pole of said electromagnet to indicate its polarity.

H. CHESTER OTTESON.

REFERENCES CITED

The following references are of record in the file of this patent:

UNITED STATES PATENTS

| Number | Name | Date |
| --- | --- | --- |
| 508,827 | Knap et al. | Nov. 14, 1893 |
| 1,666,309 | Ray | Apr. 17, 1928 |